United States Patent

Okada et al.

[11] Patent Number: 5,476,695
[45] Date of Patent: Dec. 19, 1995

[54] SPARKING PLUG CAP

[75] Inventors: Mika Okada; Noriya Okamoto, both of Yokkaichi, Japan

[73] Assignee: Sumitomo Wiring Systems, Ltd., Yokkaichi, Japan

[21] Appl. No.: 306,994

[22] Filed: Sep. 16, 1994

[30] Foreign Application Priority Data

Sep. 20, 1993 [JP] Japan ..................... 5-233205

[51] Int. Cl.⁶ .................................................. H01T 13/06
[52] U.S. Cl. .................. 428/1; 123/169 R; 123/169 PA; 123/169 PH; 313/118; 313/129; 313/130; 313/137; 428/323; 428/325; 439/125
[58] Field of Search .............................. 428/1, 323, 325; 313/118, 129, 130, 137; 439/125; 123/169 PA, 169 PH, 169 R

[56] References Cited

U.S. PATENT DOCUMENTS

| | | | |
|---|---|---|---|
| 4,082,980 | 4/1978 | Yoshikawa et al. | 315/59 |
| 4,123,688 | 10/1978 | Yoshikawa et al. | 315/58 |
| 4,810,198 | 3/1989 | Sturdevan | 439/125 |
| 4,884,977 | 12/1989 | Sturdevan | 439/125 |
| 5,179,327 | 1/1993 | Yagi et al. | 315/77 |

FOREIGN PATENT DOCUMENTS

| | | |
|---|---|---|
| 0488216 | 6/1992 | European Pat. Off. . |
| 1161688 | 6/1989 | Japan . |
| 3-43259 | 4/1991 | Japan . |
| 2212676 | 7/1989 | United Kingdom . |

OTHER PUBLICATIONS

European Search Report and Annex.
Partial English Language Translation of JP-U-3-43259.

*Primary Examiner*—Nasser Ahmad
*Attorney, Agent, or Firm*—Sandler, Greenblum & Bernstein

[57] ABSTRACT

A sparking plug cap for internal combustion engines which is made of a resin selected from the group consisting of an alloy of polyphenylene sulfide and polyphenylene oxide, polyarylate, polyether imide and a liquid crystalline polymer, which sparking plug cap is excellent in insulation durability at a high temperature, particularly under a high humidity or in the presence of water.

12 Claims, 2 Drawing Sheets

SPARKING PLUG CAP

BACKGROUND OF THE INVENTION

1. Field of the Invention

The present invention relates to a sparking plug cap for internal combustion engines.

2. Description of the Related Art

A recent tendency to higher power output of internal combustion engines leads to higher electrical voltage applied to sparking plugs and higher temperature around the engine. Thus the stringent requirement has been made for qualities of sparking plug caps, for example, the insulation durability thereof at high temperature, further the insulation durability thereof at high temperature under high humidity or in the presence of water.

Conventional sparking plug caps are made of, for example, unsaturated polyesters or polybutylene terephthalate, etc. However, the plug caps prepared from such materials cannot meet the above stringent requirement.

A sparking plug cap using polyphenylene sulfide which is a heat resistive polymer is also suggested (see Japanese Utility Model Kokai No. 43259/1991). However, it is not sufficient in dielectric strength, i.e., insulation durability, at high temperature under high humidity.

SUMMARY OF THE INVENTION

It is an object of the present invention to provide a sparking plug cap excellent in insulation durability at high temperature, particularly under high humidity or in the presence of water.

It has been found that, when a resin selected from the group consisting of an alloy of polyphenylene sulfide and polyphenylene oxide, polyarylate, polyetherimide and a liquid crystalline polymer is used as a material for sparking plug cap, the problem mentioned above can be solved.

Accordingly, the present invention provides a sparking plug cap comprising a resin selected from the group consisting of an alloy of polyphenylene sulfide and polyphenylene oxide, polyarylate, polyetherimide and a liquid crystalline polymer.

DETAILED DESCRIPTION OF THE INVENTION

Figure 1:
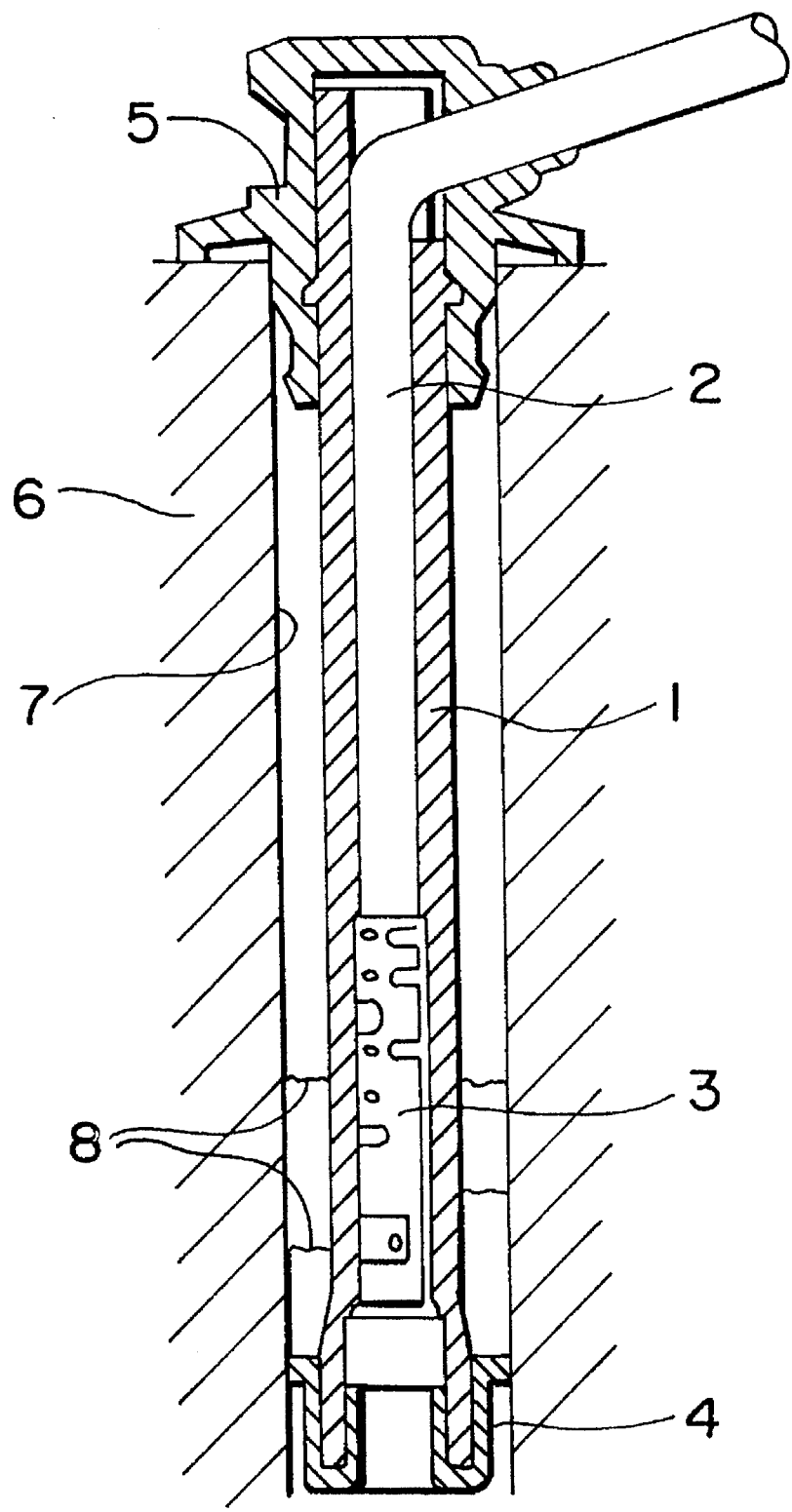
FIG. 1 shows a sectional view of a sparking plug cap according to the present invention mounted. The sparking plug cap 1 is a cylindrical object which covers a high voltage code 2 and a plug terminal 3 connected to the end of the high voltage code. An end cap 4 is fitted to an end of the sparking plug cap and a cap 5 is fitted to the base thereof. The end cap 4 and the cap 5 are set to a plug hole 7 in a engine block 6.

The polyphenylene sulfide which is a component of the polymer alloy used for the sparking plug is a polymer having the repeating units represented by the following formula;

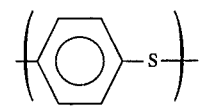

The polyphenylene oxide which is another component of the polymer alloy used for the sparking plug is a polymer having the repeating units represented by the following formula.

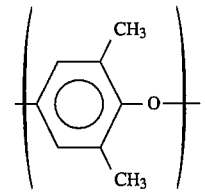

The weight ratio of the polyphenylene sulfide to the polyphenylene oxide in the polymer alloy is in the range of 5:95 to 95:5, preferably in the range of 50:50 to 95:5 by weight.

The polyarylate used is a polyester having the repeating units represented by the following formula:

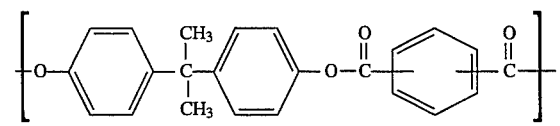

The polyetherimide used is a polymer having the repeating units represented by the following formula:

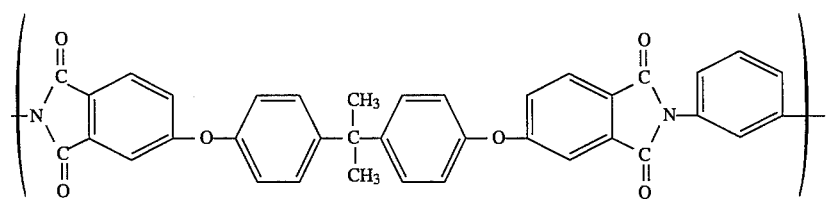

The liquid crystalline polymer used may be of a thermotropic-type or a lyotropic-type. Examples of the thermotropic-type liquid crystalline polymers are polyesters such as Vectra (a trademark, commercially available from Celanese), Echonol (a trademark, commercially available from Sumitomo Chemical), XYDER (a trademark, commercially available from Japan Petrochemical), EPE (a trademark, commercially available from Mitsubishi Chemical Industries), X7G (a trademark, commercially available from Eastman Kodak) etc.; polyesteramides, polyazomethines, etc. Example of the lyotropic-type liquid crystalline polymers are polyamides such as Kevler (a trademark, commercially available from Du Pont), Technola (a trademark, commercially available from Teijin) etc.; polybenzothiazoles, etc.

Inorganic fillers or organic fillers may be added to the resin material for the sparking plug cap according to the present invention. The addition of the filler can improve the properties of the sparking plug cap such as rigidity.

Examples of the suitable filler are fibrous filler such as glass fiber, carbon fiber, metal fiber, aramide fiber, ceramic fiber, potassium titanate, asbestos, silicon carbide, silicon nitride; fillers such as barium sulfate, calcium sulfate, kaolin, clay, pyrophylite, bentonite, sericite, zeolite, mica, nepheline, talc, attalpulgite, wollastonite, PMF, ferrite, calcium silicate, calcium carbonate, magnesium carbonate, dolomite, antimony trioxide, zinc oxide, titanium oxide, magnesium oxide, iron oxide, molybdenum disulfide, graphite, gypsum, glass beads, glass powder, glass balloon, quartz, quartz glass, etc.

The filler is used in an amount of 5 to 100 parts by weight, preferably 10 to 60 parts by weight per 100 parts by weight of the polymer(s).

To the resin material for the sparking plug cap according to the present invention, auxiliary agents such as nucleating agents, releasing agents, coupling agents, colorants, lubricants, antioxidants, UV absorbers, flame retardants, flame retardant aids, etc. may be further added.

The sparking plug cap according to the present invention can be conveniently molded by injection molding. The injection molding may be carried out at a cylindrical body temperature of 300° to 320° C. and a mold temperature of 80° to 140° C. under a injection pressure of 700 to 900 kg/cm$^2$ for the alloy of polyphenylene sulfide and polyphenylene oxide; at a cylindrical body temperature of 310° to 360° C. and a mold temperature of 120° to 140° C. under an injection pressure of 1,000 to 1,500 kg/cm$^2$ for the polyarylate; at a cylindrical body temperature of 310° to 415° C. and a mold temperature of 60° to 175° C. under an injection pressure of 750 to 1,400 kg/cm$^2$ for polyether imide; and at a cylindrical body temperature of 310° to 360° C. and a mold temperature of 60° to 180° C. under an injection pressure of 500 to 1,200 kg/cm$^2$ for the liquid crystalline polymer.

The present invention will be illustrated by Examples more specifically, but not limited thereto.

EXAMPLES

Example 1

A polymer alloy of polyphenylene sulfide (PPS) and polyphenylene oxide (PPO) in a weight ratio of PPS/PPO= 90/10 containing 30% by weight of glass fiber (Noryl APS430, commercially available from Japan GE Plastics) was dried at 120° C. for 4 hours. Then it was injection molded under the following conditions to obtain a cylindrical object having a wall thickness of 2 mm.

Cylindrical body temperature of molding machine:
Nozzle 320° C., Front 320° C., Middle 310° C., Back 300° C.

Resin temperature: 320° C.

Mold temperature: 120° C.

Injection pressure: 800 kg/cm$^2$

Example 2

A polyarylate (P-1001, commercially available from Unitika) was dried at 120° C. for 6 hours. Then it was injection molded under the following conditions to obtain a cylindrical object having a wall thickness of 2 mm.

Cylindrical body temperature of molding machine:
Front 360° C., Middle 350° C., Back 310° C.

Mold temperature: 130° C.

Injection pressure: 1,400 kg/cm$^2$

Example 3

A polyetherimide (Ultem 1000, commercially available from Japan GE Plastic) was dried at 150° C. for 4 hours. Then it was injection molded under the following conditions to obtain a cylindrical object having a wall thickness of 2 mm.

Resin temperature: 360° C.

Mold temperature: 95° C.

Injection pressure: 750 to 1,400 kg/cm$^2$

Example 4

A polyester liquid crystalline polymer (XYDAR G330, commercially available from Japan Petrochemical) was dried at 130° C. for 8 hours or at 150° for 4 hours. Then it was injection molded under the following conditions to obtain a cylindrical object having a wall thickness of 2 mm.

Cylindrical body temperature of molding machine: 350° C.

Mold temperature: 100° C.

Injection pressure: 1,000 kg/cm$^2$

Comparative Example 1

A polyphenylene sulfide containing 40% by weight of glass fiber and an inorganic filler (FZ-3360, commercially available from Dainippon Ink & Chemicals) was dried at 120° C. for 4 hours or at 140° C. for 4 hours. Then it was injection molded under the following conditions to obtain a cylindrical object having a wall thickness of 2 mm.

Cylindrical body temperature of molding machine: 300° to 340° C.

Mold temperature: 100° to 160° C.

Injection pressure: 500 to 1,300 kg/cm$^2$

Comparative Example 2

A polybutylene terephthalate containing 30% by weight of glass fiber (Novadole 5010G30, commercially available from Mitsubishi Chemical Industries) was dried at 120° C. for 5 to 8 hours or at 140° C. for 4 hours. Then it was injection molded under the following conditions to obtain a cylindrical object having a wall thickness of 2 mm.

Cylindrical body temperature of molding machine:
Front 245° C., Middle 245° C., Back 240° C.

Mold temperature: 80° C.

Injector pressure: 500 to 700 kg/cm$^2$

Comparative Example 3

An unsaturated polyester (Sumikon TM-4121, commercially available from Sumitomo Bakelite) was injection molded under the following conditions to obtain a cylindrical object having a wall thickness of 2 mm.

Cylindrical body temperature of molding machine: 40° to 90° C.

Mold temperature: 170° to 190° C.

Curing time: 10 to 15 seconds

Injection pressure: 500 to 1,500 kg/cm$^2$

Performance Evaluation

The cylindrical bodies prepared in Examples 1 to 3 and Comparative Examples 1 to 3 were tested for dielectric strength properties.

1. Dielectric strength test under a water-absorbing condition (1)

The samples are immersed for predetermined periods in hot water having a temperature of 80° C. which is placed under a circumstance of a temperature of 80° C. and a relative humidity of 95%.

Figure 2:
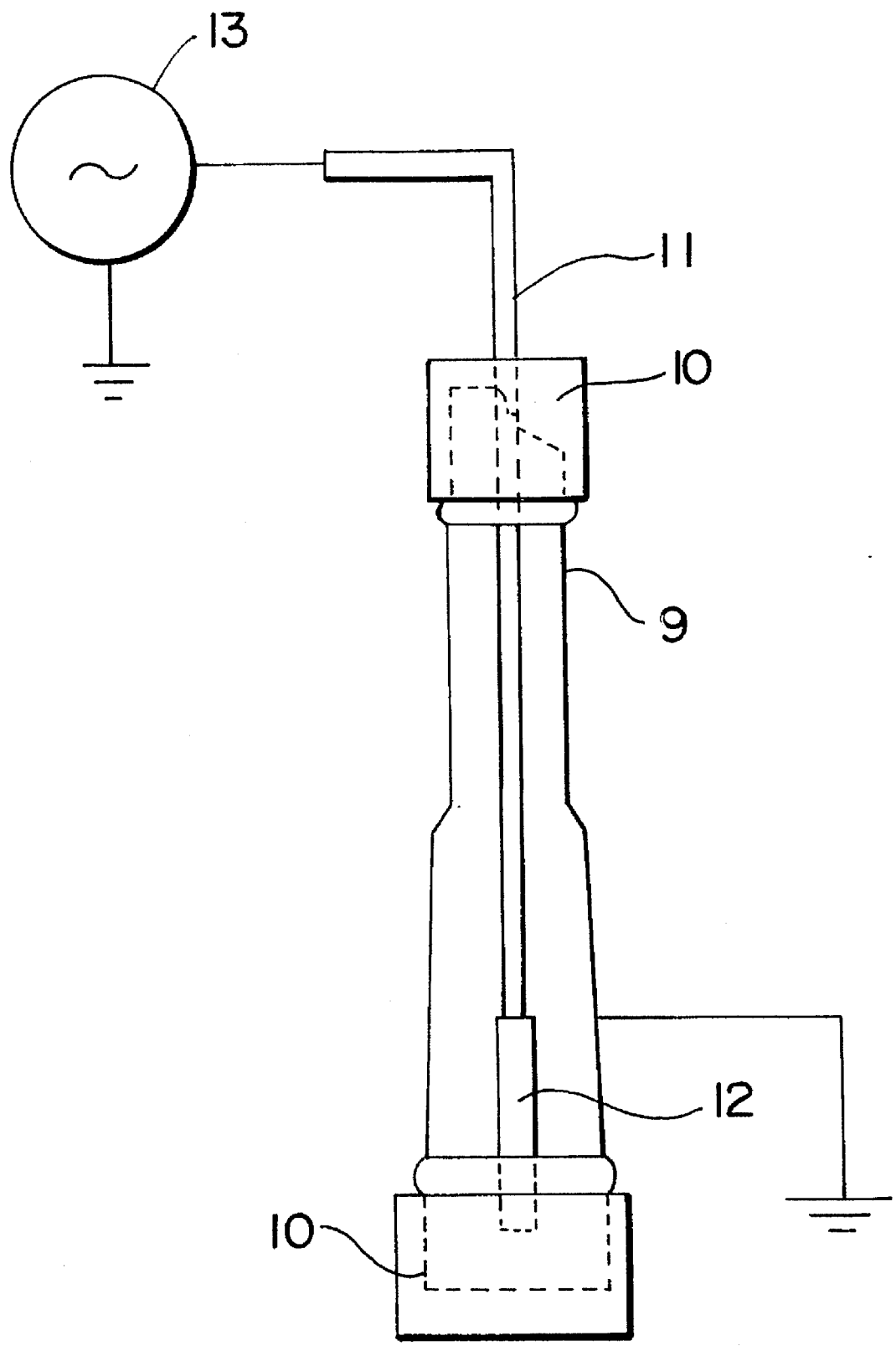
FIG. 2 shows an alternating current dielectric strength tester to evaluate the sparking plug cap according to the present invention.

Then the dielectric strength test is carried out with an apparatus shown in FIG. 2 as follows: A high tension code (HC) in a string type 11 having a plug terminal 12 is inserted in the cylindrical object 9 to be tested. Then both of the opening ends of the cylindrical object 9 are sealed with an epoxy resin 10 and a silver paint is applied to the surface of the cylindrical object. The high tension code (HC) is connected to a power supply 13. Alternating current is applied and voltage is automatically and continuously increased to a maximum of 60 kV to find the voltage at which dielectric breakdown occurs. The results are given in Table 1.

TABLE 1

| Sample | Dielectric Strength (kV.) Immersing Time in Water (hr.) | | | |
|---|---|---|---|---|
|  | 0 | 72 | 168 | 336 |
| Example 1 | 55.8 | 49.9 | 43.3 | 38.3 |
| Example 2 | 56.0 | 55.5 | 54.6 | 60.0 |
| Example 3 | 60.0 | 60.0 | 59.2 | 60.0 |
| Example 4 | 53.0 | 42.8 | 39.7 | 38.5 |
| Comp. Ex 1 | 29.0 | 16.1 | 10.7 | 11.2 |
| Comp. Ex 2 | 53.5 | 42.0 | 43.8 | 33.4 |
| Comp. Ex. 3 | 56.9 | 23.7 | 9.4 | 6.7 |

2. Dilectric strength test under a water-absorbing condition (2)

The samples are allowed to stand for a predetermined time in a water vapor having a temperature of 120° C. and a relative humidity of 100%, which was generated by pressurizing water vapor to 1 kgf/cm$^2$G with an autoclave. Then they are subjected to the electrical strength test in the similar manner to that in (1). The results are given in Table 2.

TABLE 2

| Sample | Dielectric Strength (kV.) Retaining Time in Water Vapor (hr.) | | | |
|---|---|---|---|---|
|  | 0 | 24 | 48 | 100 |
| Example 1 | 55.8 | 51.8 | 39.1 | 34.9 |
| Comp. Ex 2 | 53.5 | 44.4 | 23.0 | 11.3 |
| Comp. Ex. 3 | 56.9 | 6.9 | c.m. | c.m. |

Note:
c.m.: cannot be measured

3. Dielectrical strength test at high temperature

A test was carried out in the following procedure:

(1) Both the opening ends of the cylindrical object are sealed with a heat resistant epoxy resin for insulation.

(2) A silver paint is applied to the surface of the cylindrical object.

(3) The cylindrical object is wrapped with a heater, which is connected through a variable rheostat to a power supply. The temperature of the cylindrical object is increased to a predetermined temperature over a period of 30 minutes by changing voltage.

(4) The cylindrical object is set to the above alternating current dielectric strength tester immediately after reaching the predetermined temperature.

(5) The voltage of the tester is elevated at a rate of 500 V/sec. to find the voltage at which dielectric breakdown occurs.

The results are given in Table 3.

TABLE 3

| Temp. | Dielectric Strength (kV.) | | | | | |
|---|---|---|---|---|---|---|
|  | Example | | | Comparative Example | | |
|  | 1 | 2 | 3 | 1 | 2 | 3 |
| R.T. | 57.0 | 60.0 | 60.0 | 30.4 | 53.5 | 45.0 |
| 90 | 51.0 | 46.0 | 48.5 | 26.0 | 46.1 | 41.8 |
| 120 | 45.7 | 41.4 | 45.7 | 24.7 | 54.0 | 35.7 |
| 160 | 48.8 | 39.4 | 47.6 | 33.1 | 49.5 | 39.0 |
| 180 | 48.0 | 39.5 | 39.5 | 33.0 | 48.0 | 36.5 |
| 200 | 50.1 | 38.6 | 31.2 | 33.2 | 33.5 | 34.0 |
| 210 | 46.0 | 35.0 | 27.0 | 33.0 | 25.6 | 32.5 |
| 220 | 42.0 | 29.0 | 23.5 | 33.0 | 22.4 | 26.7 |
| 230 | 38.5 | 23.5 | 20.0 | 33.2 | 7.4 | 16.0 |
| 240 | 35.4 | 18.9 | 15.4 | 33.6 | c.m. | c.m. |
| 260 | 26.0 | c.m. | c.m. | c.m. | c.m. | c.m. |
| 270 | 17.3 | c.m. | c.m. | c.m. | c.m. | c.m. |

Note:
c.m.: cannot be measured

According to the present invention, a sparking plug cap for internal combustion engines excellent in insulation durability at high temperature, particularly under high humidity or in the presence of water can be provided.

What is claimed is:

1. A sparking plug cap which comprises a resin selected from the group consisting of an alloy of polyphenylene sulfide and polyphenylene oxide, polyarylate, polyetherimide and a liquid crystalline polymer.

2. A sparking plug cap as claimed in claim 1 which further comprises an inorganic or organic filler.

3. A sparking plug cap as claimed in claim 2 wherein the inorganic filler is glass fiber.

4. A sparking plug cap as defined in claim 1 which further comprises an auxiliary agent.

5. A sparking plug cap as claimed in claim 4 wherein the auxiliary agent comprises at least one material selected from the group consisting of nucleating agents, releasing agents, coupling agents, colorants, lubricants, antioxidants, UV absorbers, flame retardants and flame retardant aids.

6. A sparking plug cap of claim 1 wherein the ratio of polyphenylene sulfide to polyphenylene oxide in said polymer alloy is in the range of from 5:95 to 95:5, by weight.

7. A sparking plug cap of claim 6 wherein the ratio of polyphenylene sulfide to polyphenylene oxide in said polymer alloy is in the range of from 50:50 to 95:5, by weight.

8. A sparking plug cap of claim 1, wherein said liquid crystalline polymer is a thermotropic or lyotropic polymer.

9. A sparking plug cap of claim 8, wherein said liquid crystalline polymer is a thermotropic polymer.

10. A sparking plug cap of claim 8, wherein said liquid crystalline polymer is a lyotropic polymer.

11. A sparking plug cap of claim 2, wherein said filler is present in an amount of from 5 to 100 parts per 100 parts by weight of the polymers.

12. A sparking plug cap of claim 11, wherein said filler is present in an amount of from 10 to 60 parts per 100 parts by weight of the polymers.

* * * * *